United States Patent
Lewis et al.

(10) Patent No.: US 10,007,552 B2
(45) Date of Patent: Jun. 26, 2018

(54) SYSTEM AND METHOD FOR DUAL OS MEMORY SWITCHING

(71) Applicant: Insyde Software Corp., Taipei (TW)

(72) Inventors: Timothy Andrew Lewis, El Dorado Hills, CA (US); Mike Su, Taipei (TW); Jeremy Wang, New Taipei (TW)

(73) Assignee: Insyde Software Corp., Taipei (TW)

(*) Notice: Subject to any disclaimer, the term of this patent is extended or adjusted under 35 U.S.C. 154(b) by 47 days.

(21) Appl. No.: 14/521,005

(22) Filed: Oct. 22, 2014

(65) Prior Publication Data

US 2015/0113257 A1 Apr. 23, 2015

Related U.S. Application Data

(60) Provisional application No. 61/894,537, filed on Oct. 23, 2013.

(51) Int. Cl.
*G06F 9/48* (2006.01)
*G06F 9/46* (2006.01)
*G06F 9/4401* (2018.01)

(52) U.S. Cl.
CPC .......... *G06F 9/4806* (2013.01); *G06F 9/441* (2013.01); *G06F 9/4418* (2013.01); *G06F 9/461* (2013.01)

(58) Field of Classification Search
CPC ...... G06F 1/3234; G06F 9/441; G06F 9/4418; G06F 9/461; G06F 9/4806
See application file for complete search history.

(56) References Cited

U.S. PATENT DOCUMENTS

| | | | |
|---|---|---|---|
| 6,678,712 B1* | 1/2004 | McLaren | G06F 9/45558 718/100 |
| 6,795,912 B1* | 9/2004 | Itoh | G06F 9/441 709/221 |
| 7,356,677 B1* | 4/2008 | Rafizadeh | G06F 9/4418 713/1 |
| 8,195,624 B2 | 6/2012 | Yang | |
| 8,504,850 B2* | 8/2013 | Wu | G06F 1/3203 713/300 |
| 2006/0133362 A1* | 6/2006 | Stein | G06F 9/441 370/360 |
| 2008/0126879 A1* | 5/2008 | Tiwari | G06F 11/0712 714/46 |
| 2008/0189538 A1* | 8/2008 | King | G06F 9/4418 713/1 |
| 2010/0064159 A1* | 3/2010 | Wu | G06F 1/3203 713/323 |

(Continued)

OTHER PUBLICATIONS

Intel Corporation, Intel® Rapid Storage Technology enterprise (Intel® RSTe). Enterprise RAID driver powered by Intel® Xeon® Processors. www.intel.co/go/raid. 2 pages (2012).

(Continued)

*Primary Examiner* — Mark Connolly
*Assistant Examiner* — Mohammad A Rahman
(74) *Attorney, Agent, or Firm* — McCarter & English, LLP; John S. Curran (57) ABSTRACT

A mechanism for making more memory available in a computing device featuring dual operating systems uses the device firmware to save the contents of overlapped memory locations being used by the operating systems to non-volatile storage when switching operating systems while speeding up the switching process.

20 Claims, 5 Drawing Sheets

(56) References Cited

U.S. PATENT DOCUMENTS

| | | | |
|---|---|---|---|
| 2011/0271088 A1* | 11/2011 | Princen | G06F 9/45533 713/2 |
| 2011/0320801 A1* | 12/2011 | Nimura | G06F 9/4418 713/2 |
| 2013/0054955 A1* | 2/2013 | Oh | G06F 9/4418 713/100 |
| 2013/0297924 A1* | 11/2013 | Laue | G06F 9/441 713/2 |
| 2014/0115308 A1* | 4/2014 | Li | G06F 9/4406 713/1 |
| 2015/0033225 A1* | 1/2015 | Rothman | G06F 9/45533 718/1 |
| 2015/0332056 A1* | 11/2015 | Dolph | G06F 17/30 726/26 |

OTHER PUBLICATIONS

Sexton, AMI's AMIDuOS Offers Android Emulator on Windows. Retrieved online at: http://www.tomshardware.co.uk/amiduos-android-windows,news-49714.html. 6 pages. Feb. 11, 2015.

* cited by examiner

SYSTEM AND METHOD FOR DUAL OS MEMORY SWITCHING

RELATED APPLICATION

This application is related to, and claims the benefit of, U.S. Provisional Patent Application No. 61/894,537, entitled "System and Method for Dual OS Memory Switching", filed Oct. 23, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier operating system (OS)/firmware interfaces previously used by the industry and commonly known as legacy BIOS (Basic Input Output System). When implemented in a computing device, the machine codes for UEFI firmware and all permanent data used by the firmware reside in Read Only Memory (ROM).

Some computing devices are configured to boot multiple operating systems. Computing devices equipped with two independent operating systems may be referred to as dual OS systems. Conventionally, in such a dual OS computing device, both operating systems are required to be loaded into volatile memory at the same time or the computing device is required to suspend operation and either power off or hibernate while the operating systems are switched or the current operating system must shut down, the computing device must reset and then load the other operating system.

BRIEF SUMMARY

Embodiments of the present invention provide a mechanism for reducing the memory required in a computing device when two independent operating systems are loaded on the computing device and for speeding up the time required to switch between the operating systems. In response to a user action indicating a desire to switch from a first operating system to a second operating system, a first operating system is changed from an active state to an inactive state and a firmware controlled process copies the contents of memory locations used by the first operating system that overlap with the memory locations that will be used by the second operating system into non-volatile storage. The second operating system is then changed from an inactive state to an active state and loaded into memory. Subsequently, when a user action places the second operating system back into an inactive state, the values in the overlapping memory locations being used by the second operating system are copied into non-volatile storage and the previously stored memory values for the overlapping memory locations used by the first operating system are loaded back into memory. The first operating system may then be made active.

In one embodiment a computing device-implemented method for switching operating systems in a computing device equipped with firmware and an enhanced dual operating system (OS) having a first OS and a second OS includes the step of loading the first OS into volatile memory for the computing device. The method also identifies a user-initiated switching event requesting a switch of operating systems. The device firmware, in response to the switching event, saves the contents of overlapped memory locations that are used for the first OS in the volatile memory to non-volatile storage. The overlapped memory locations are also used by the second OS. The method further loads from non-volatile storage contents for a second OS to the overlapped memory locations in the volatile memory and resumes operation of the computing device under control of the second OS.

In another embodiment, a computing device equipped with firmware and an enhanced dual operating system (OS) that includes a first OS and a second OS includes a central processing unit (CPU), a volatile memory and a non-volatile storage. The computing device also includes device firmware. The device firmware is configured to load the first OS into the volatile memory and identify a user-initiated switching event requesting a switch of operating systems. In response to the user-initiated switching event, the device firmware is configured to save contents of overlapped memory locations that are used for the first OS in the volatile memory to the non-volatile storage. The overlapped memory locations are also used by the second OS. The device firmware is additionally configured to load from the non-volatile storage contents for a second OS to the overlapped memory locations in the volatile memory, wherein operation of the computing device is resumed under control of the second OS.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

During a boot sequence for a computing device, an operating system (OS) for the computing device is loaded into volatile memory such as Random Access Memory (RAM). Once normal operation has begun, some computing devices allow a user of the computing device to switch to another operating system. Embodiments of the present invention make more memory available in such a dual-OS computing device by using the device firmware in an expedited process not requiring hibernation or powering off of the computing device to switch out and save the contents of overlapped memory locations being used by more than one operating system. This approach reduces performance degradation associated with conventional hibernate or power-off solutions as the saving and restoring of the contents of the overlapped memory locations can be performed quickly and requires less volatile memory to hold the two operating systems.

Figure 1:
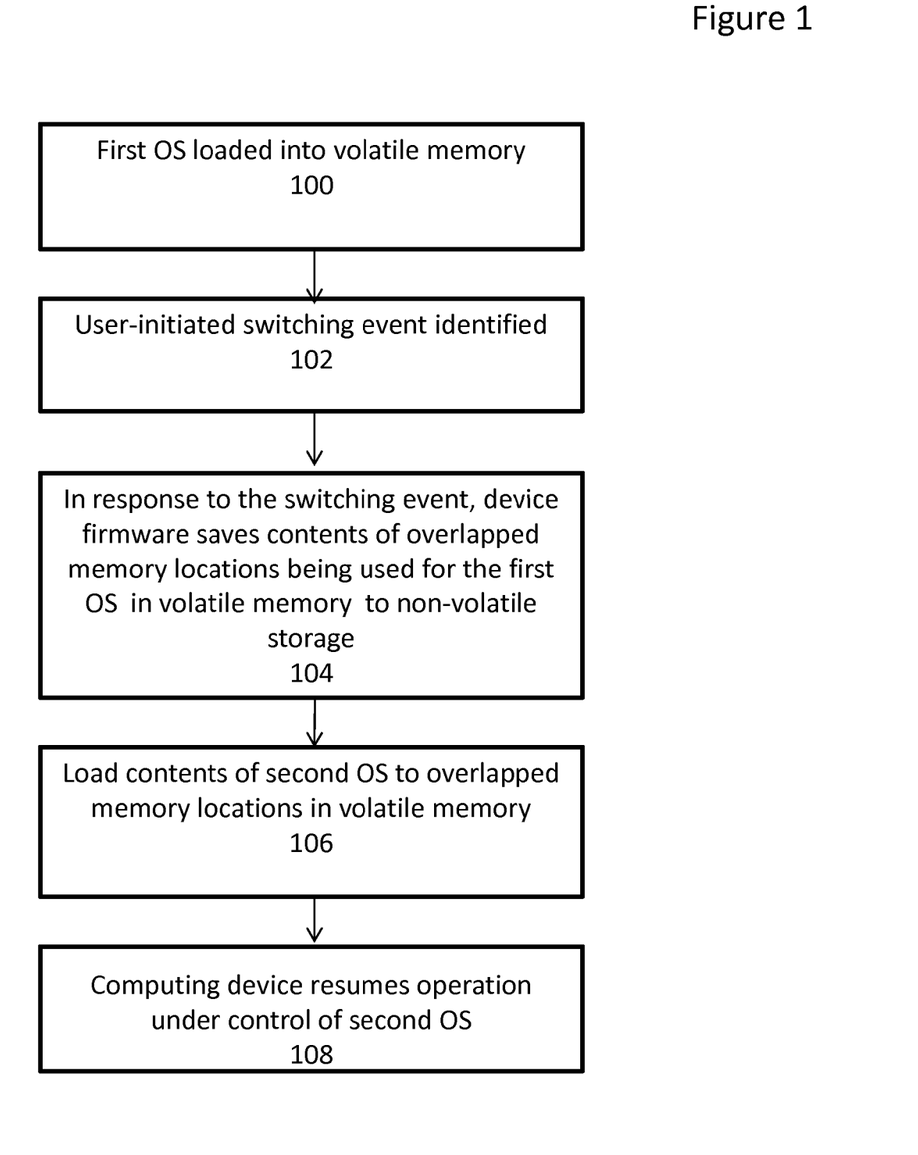
FIG. 1 depicts an exemplary overall sequence of steps performed by an embodiment of the present invention to switch a first operating system to a second operating system in a computing device equipped with an enhanced dual OS.

FIG. 1 depicts an exemplary overall sequence of steps performed by an embodiment of the present invention to switch the active operating system for a computing device from a first OS to a second OS in a computing device equipped with an enhanced dual OS. In one embodiment, the first OS and the second OS may be different types and sizes of operating systems. For example, the first OS may be an ANDROID operating system with a smaller memory footprint while the second OS may be a WINDOWS OS with a larger memory footprint. The sequence begins when a first OS is loaded into volatile memory (step 100). Subsequently, during normal operation of the computing device controlled by the first OS, a user-initiated switching event, such as pressing a physical button or hot key set aside for this purpose or selecting an option in the operating system or an operating system application, is identified. For example, when the user-initiated event occurs device firmware or an OS-resident application or driver may detect the event and set a flag that is readable by the device firmware (step 102). In response to the identification of the switching event, the device firmware saves the contents of memory locations in volatile memory that are being used for the first OS and that overlap with the memory locations that will be used by the second OS to non-volatile storage (step 104). These memory locations in volatile memory that are to be used by both the first OS and the second OS (in a non-simultaneous manner) are referred to hereafter as "overlapped memory locations". The non-volatile storage into which the contents of the overlapped volatile memory locations are saved may be a hard drive, a Solid State Drive (SSD), flash ROM or some other type of non-volatile storage. As will be explained in greater detail below, the saving of the contents of the overlapped memory locations may follow the handling by the device firmware of a sleep state request generated by the switching event. After the contents of the overlapped memory locations have been saved to non-volatile storage by the device firmware (step 104), the device firmware may load contents of the second OS to the overlapped memory locations (step 106) and the computing device resumes normal operation under control of the second OS (step 108).

It should be appreciated that the loading of contents of the second OS to the overlapped memory locations in volatile memory described above with respect to FIG. 1 may also be accompanied by the loading of additional contents of the second OS to other non-overlapped locations in volatile memory if the second OS is larger than the first OS and the second OS has not been previously loaded. For example, in the situation where the first OS was an ANDROID OS with a smaller memory footprint and the second OS was a WINDOWS OS with a larger memory footprint that had not previously been loaded, the overlapped locations would equate to the ANDROID memory map and the contents of the overlapped locations being used for the ANDROID OS would be saved to non-volatile storage prior to loading all of the WINDOWS OS into volatile memory locations that include the overlapped locations. Alternatively, if the WINDOWS OS had been previously loaded and then the computing device had switched to the ANDROID OS before switching back to the WINDOWS OS, only the previously saved contents of the overlapped locations used by the WINDOWS OS which had been saved when the ANDROID OS was activated would need to be restored since the portion of the WINDOWS OS from initial loading that resided in volatile memory in non-overlapped locations would not have been disturbed by the ANDROID OS being activated and de-activated. This mechanism of saving and restoring only the contents of the overlapped memory locations makes more of the computing device's memory available for whichever operating system is active. This swapping of memory contents is especially important for smaller memory configuration systems, where one operating system uses less memory than the other operating system. Embodiments of the present invention thus provide an operating environment with the same amount of physical memory available for a WINDOWS OS as would be available in a normal WINDOWS implementation. It will be appreciated that other operating systems may be substituted for ANDROID and/or WINDOWS without departing from the scope of the present invention.

Figure 2:
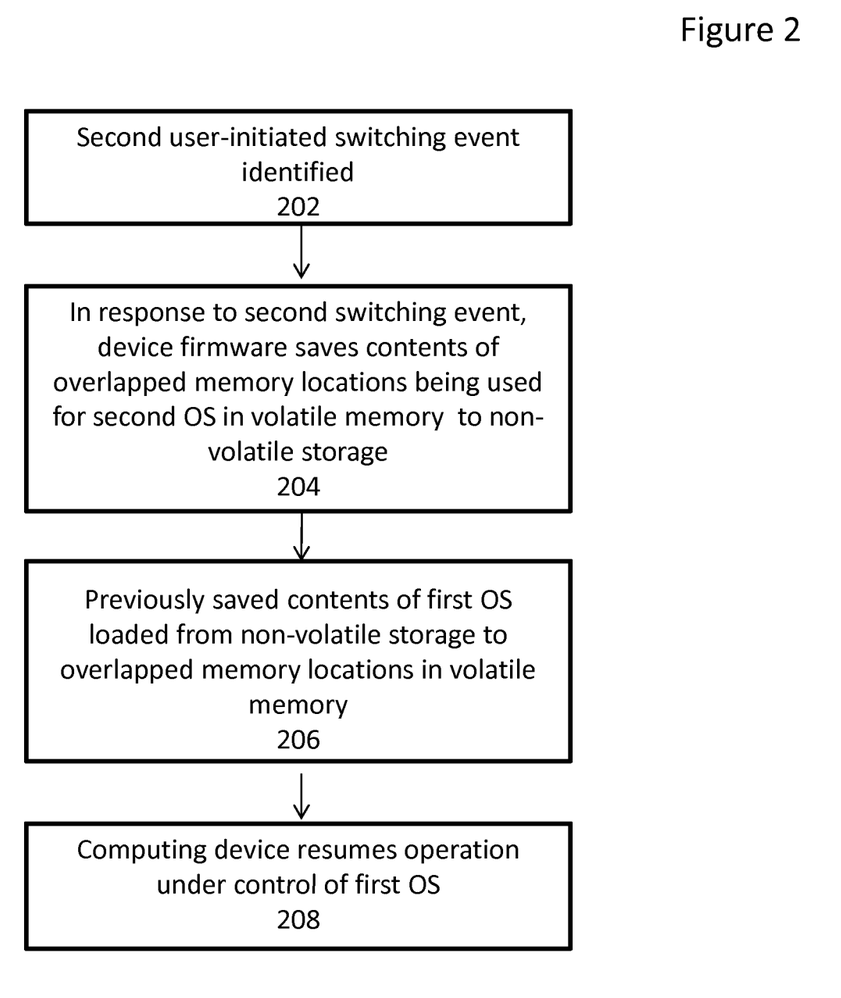
FIG. 2 depicts an exemplary sequence of steps performed by an embodiment of the present invention to save memory contents for overlapped memory locations used by a second operating system when switching the second operating system to an inactive state.

Continuing from the example of FIG. 1, once the computing device has switched from the first OS to the second OS it can also switch back. FIG. 2 depicts an exemplary sequence of steps performed by an embodiment of the present invention to save memory contents for overlapped memory locations used by the second OS when switching the second OS to an inactive state and restoring the first OS to control the computing device's operation. The sequence begins when a second user-initiated switching event is identified (step 202). In response to the switching event, the device firmware saves the contents of the overlapped memory locations in volatile memory (now being used for the second OS) to non-volatile storage (step 204). As noted above, the saving of the contents of the overlapped memory locations may follow the handling of a sleep state request generated by the switching event. The firmware then loads the previously saved contents of the first OS from non-volatile storage to the overlapped memory locations (step 206). The computing device may then resume operation under control of the first OS (step 208).

Embodiments of the present invention may utilize different sleep states in order to switch the active operating system for a computing device. The particular sleep states will vary depending upon the configuration of the computing device. As one example, the Advanced Configuration and Power Interface (ACPI) specification defines a standard for device configuration and power management to be implemented by the operating system (OS) in computing devices. The ACPI standard defines four global power states for computing devices running from G0 (working with the monitor off) to G3 (mechanical off). The standard also defines six sleep states within these global states ranging from S0 (on) to S5 (off). The sleep-states describe gradually greater degrees of power savings and greater lengths of time needed to make the system available to a user. Higher numbered sleep states save more power but require more time to return to normal operation. For example a computing device in an S3 power state is saving more power than a computing device in an S1 state while a system in an S5 state requires more time to respond to a user input command than a system in an S3 power state. In an ACPI-compliant computing device, an operating system controls the transition of the computing device between sleep-states by writing a specific "sleep value" to a sleep register.

The six sleep-states defined by the ACPI specification are:

S0: On (not sleeping) (within the G0 power state).

S1 : The S1 sleep state is a low wake latency sleep state. In this state, no system context is lost (CPU or chipset) and the hardware maintains all system context.

S2 : The S2 sleep state is a low wake latency sleep state. This state is similar to the S1 sleeping state except that the CPU and system cache context is lost (the OS is responsible for maintaining the caches and CPU context). Control starts from the processor's reset vector after a wake event is detected.

S3: The S3 sleep state is a low wake latency sleep state where all system context is lost except system memory. CPU, cache, and chipset context are lost in this state. Hardware maintains memory context and restores some CPU and L2 configuration context. Control starts from the processor's reset vector after a wake event is detected.

S4: The S4 sleep (hibernate) state is the lowest power, longest wake latency sleep state supported by ACPI. In order to reduce power to a minimum, it is assumed that the hardware platform has powered off all devices. Platform context is maintained. The S1-S4 sleep states are divisions occurring within the G1 (sleeping) global power state.

S5: Soft Off State. The S5 sleep state is similar to the S4 state except that the OS does not save any context. A power supply unit supplies power to allow a return to the S0 state. The system is in the "soft" off state and requires a complete boot when it wakes. Software uses a different state value to distinguish between the S5 sleep state and the S4 sleep state to allow for initial boot operations within the BIOS to distinguish whether or not the boot is going to wake from a saved memory image. The S5 soft off state occurs within the G2 global power state (The G3 (mechanical off) power state differs from the G2 power state in that the computer system's power supply unit no longer supplies power as the power has been removed from the system via a mechanical switch).

In an ACPI-compliant computing device a "sleep control register" is an I/O register defined in a Fixed ACPI Description Table (FADT). A FADT is an ACPI-defined table which describes a number of fixed hardware resources, including a Sleep Control Register. Conventionally, in order to trigger a sleep-state transition, the operating system checks the address of a sleep control register defined in the FADT and writes a sleep type value associated with a desired sleep-state to the address. The ACPI specification defines different values that should be written to the SLP_TYP field of the PM1 Control or Sleep Control register, based on the identity of the sleep-state to which the operating system desires to transition.

As noted above, the saving of the contents of the overlapped memory locations in volatile memory by embodiments of the present invention may follow the handling of a sleep state request generated by the switching event. In one embodiment, the user-initiated switching event may cause the operating system to instruct the hardware to enter the hibernate (S4) sleep state by writing an appropriate command to the sleep control register (as described in the ACPI specification, for example), but a hardware-defined mechanism, such as the sleep-state transition trap capabilities of most INTEL and AMD south bridges, instead generates a software System Management Interrupt (SMI) which transfers control of the computing device to a registered SMI handler provided by the firmware. This SMI handler initializes the hardware to prepare a wake event which will occur almost immediately after the sleep state transition is complete. Then the SMI handler places the system into the suspend S3 sleeping state instead of a hibernate S4 sleep state. Upon waking from the S3 sleep state, which occurs more quickly than waking from the S4 hibernation sleep state, the device firmware saves and restores the contents of the overlapped memory locations as described above. It should be noted that the S3 state is used, instead of the S2 or S1 states because the current OS prepares attached devices to be reset prior to entering S3 and thus ready to be reinitialized by the next OS, whereas S2 and S1 do not. Also, S3 provides an efficient way to hand control to the firmware in order to perform the memory swap action.

In another embodiment, the operating system instructs the hardware to enter the suspend (S3) sleep state but a hardware-defined mechanism, such as the sleep-state transition trap found in Intel and AMD chipsets, instead generates a software SMI, which transfers control back to a registered SMI handler provided by the firmware. This SMI handler initializes the hardware to prepare a wake event which will occur almost immediately after the sleep state transition is complete. Then the SMI handler places the system in the S3 sleep state. The previously set up wake event fires, causing the system to resume from the S3 sleeping state after which the UEFI (or other type of) firmware performs necessary actions required to restore the memory configuration and the overlapped memory contents as described above.

In one embodiment, the operating system instructs the hardware to enter the suspend (S3) sleep state, but the hardware mechanism described in the ACPI tables for making such a transition actually describes a CPU-reset register, returning control to the firmware at the CPU reset vector. The firmware saves and restores the contents of the overlapped memory locations as described above in order to switch the OS as requested by the user. This method can be used when no S3 support is present on the platform and has the advantage that no wakeup-signal needs to be configured in order to initiate it.

In another embodiment, the user initiates an OS switching event but the operating system does not support suspend (S3) or hibernate (S4) sleep states. In this case, the firmware traps the OS switch and generates a CPU-only reset. This can be done via an SMI (an SMI is generated on the OS switch event and the SMI handler saves the CPU save state and triggers a reset) or via hardware-support. This approach has the effect of returning control to the firmware at the CPU reset vector, but memory contents are preserved. After the CPU reset, the memory is still configured, so there is no need to restore the memory configuration. When switching back, the resume code restores the overlapped memory locations as described above, but then generates an SMI, restores the CPU state, and the resumes back into the alternate OS.

In some computing devices, the CPU has a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the dedicated memory. An electrical signal is made available within the circuitry of the computing device which can indicate when the CPU is operating within SMM. The CPU device may be directed to transition from normal operating mode to SMM by SMI events including SMI events triggered by firmware. The exact triggers available differ somewhat from among system designs but the result when the platform appropriate trigger is used is always that execution in main memory is immediately suspended and execution begins at a specific location in SMM memory. In one embodiment of the present invention, the user initiates an OS switch event but the operating system does not support suspend (S3) or hibernate (S4) sleep states. Instead the firmware replaces the description of the sleep state transition hardware-provided register in the ACPI tables with that of a hardware-provided register that generates an SMI or causes a trap to a driver (such as the use for Fixed Feature Hardware registers in ACPI). The firmware saves the CPU save state, some other additional hardware state, prepares an immediate wake event and triggers the S3 sleep state directly using the sleep-type and sleep-enable register (ACPI-defined for example). The system wakes, with the CPU executing at the CPU reset vector, the overlapped memory configuration is restored, the SMM environment is recreated, and then the firmware generates an SMI, restores the hardware and CPU state and resumes back into the alternate OS.

In another embodiment, the user initiates an OS switch event and the operating system is not configured to support suspend (S3) or hibernate (S4) sleep states but still has the capability. In this case, the embodiment modifies the configuration of the operating system such that an S3 sleep state is used. For example, in cases where the OS and the platform support very low-power S0 states, the OS power management policy usually disables S3 by default, but this policy can be adjusted through OS APIs or the OS registry.

In one embodiment, the user initiates an OS switch event and the operating system is not configured to support a suspend (S3) sleep state but does support a hibernate (S4) sleep state. In this case, the embodiment uses an S4 sleep state. While this approach lacks the performance advantage of waking from the S3 sleep state, it still provides the above-described benefit of reduced memory usage. Further, with the reduced memory usage there is a reduced resume time since the transfer of saved memory contents from the disk increases linearly with the amount of memory saved so that with less memory contents saved, less time is required for a S4-style resume.

In another embodiment, the user initiates an OS switch event and the operating system is configured to support low-power S0 states, but also supports either S3 or S4 sleep states. In this case, the embodiment first wakes the system from the low-power S0 state and then uses the S3 sleep state (if supported) or S4 sleep state. The other sleep states are used in order to transfer control back to the firmware with the system in a state that makes it convenient to read the stored memory contents and transfer control to the alternate OS while the system devices are in a quiescent state.

Figure 3:
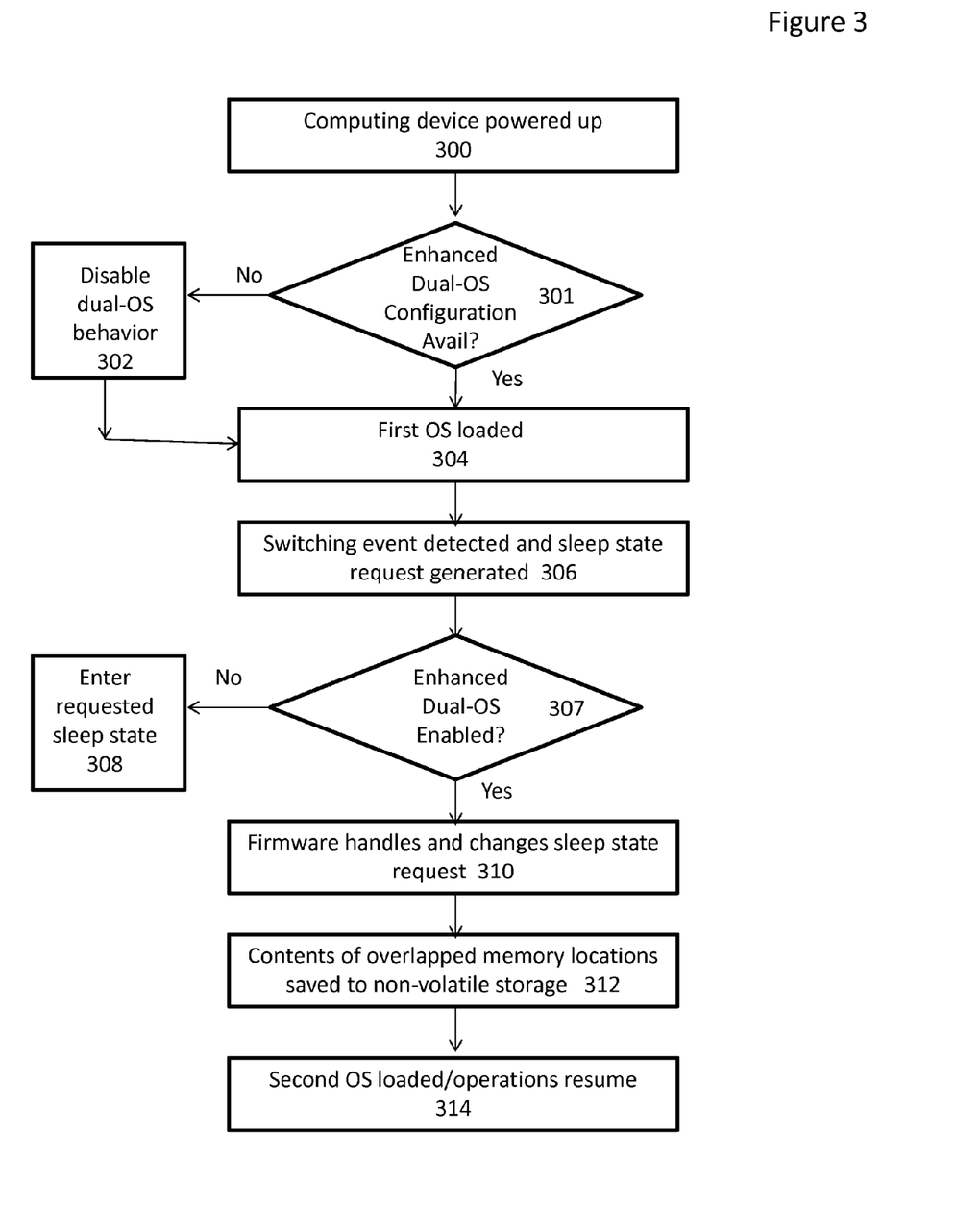
FIG. 3 depicts an exemplary sequence of steps performed by an embodiment of the present invention to handle a switching event in an enhanced dual OS computing device.

Prior to the handling of the switching event, the device firmware in an embodiment may have first verified the ability of the computing device to perform the enhanced dual OS mechanism described herein. FIG. 3 depicts an exemplary sequence of steps performed by an embodiment of the present invention to handle a switching event in an enhanced dual OS computing device. The operating system switching sequence begins with the computing device in a full-off (G3) power state. After power is applied to the computing device, a boot sequence begins (step 300). Initially, during the pre-OS boot process (prior to the loading of the operating system), the device firmware of the present invention may check to see whether the system is able to support enhanced dual OS behavior described herein (step 301). This detection may involve making sure that there is adequate non-volatile storage available to support the saved overlapped volatile memory contents. As an example, the firmware may check whether a SSD storage device is attached and the required partition is prepared. As another example, the firmware may check whether a secondary flash device is present on the motherboard and has been erased. As a further example, the firmware may check whether a hard drive is attached and the required partition is prepared. As another example, the firmware may check whether the hard disk or SSD is present, and whether there is enough space to create the required partition. If the conditions to support enhanced dual OS behavior are not present, then the enhanced dual OS behavior is disabled by the firmware (step 302). Alternatively, in this condition, dual OS support may continue to operate per the previous condition and the memory map may be adjusted to reserve the memory for the second OS.

If the conditions to support enhanced dual OS behavior are present (i.e. there is adequate non-volatile storage)(step 301), then the enhanced dual OS behavior is enabled by the firmware and the first OS is booted (i.e. loaded into memory) (step 304). Subsequently during normal operation of the computing device, a user-initiated switching event may be detected and a sleep state request generated (step 306). For example, the operating system may be told to enter an S4 sleep state. The device firmware checks to see if the enhanced dual OS behavior has been enabled (step 307). If the enhanced dual OS behavior has not been enabled(step 307), the computing device enters the requested sleep state and switches operating systems after a full hibernation according to a conventional technique (step 308). If the enhanced dual OS behavior has been enabled(step 307), the firmware handles the request as described above (e.g. enters a different sleep state, generates a CPU-only reset, etc.) (step 310), saves the contents of the overlapped volatile memory locations to non-volatile storage (step 312) and loads the second OS into volatile memory (step 314), after which normal operation of the computing device resumes under control of the second OS.

Although the descriptions contained herein have described a dual OS system, it should be appreciated that in one embodiment, a multi-OS system in which the device firmware switches between more than two operating systems is also within the scope of the present invention.

Figure 4:
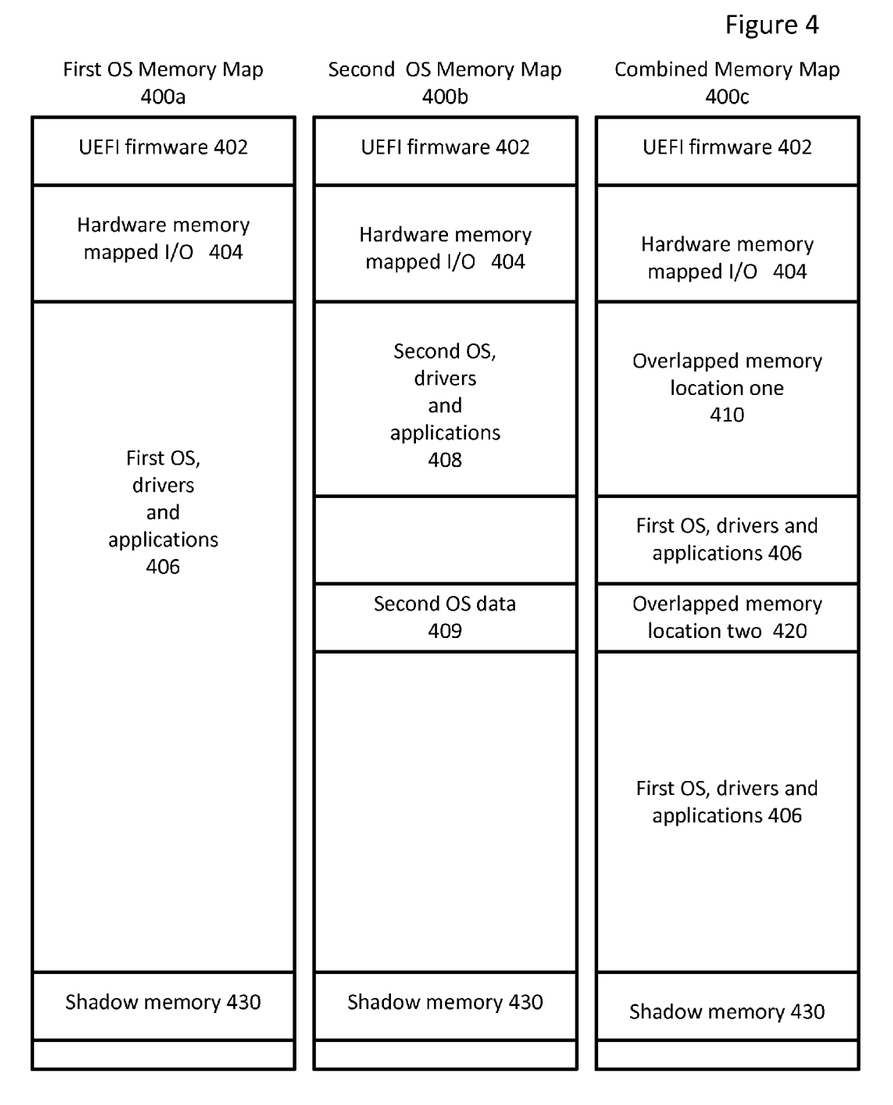
FIG. 4 depicts an example of memory maps for a first and second OS and a combined memory map in an embodiment of the present invention.

FIG. 4 depicts an example of overlapped volatile memory locations used by a first and second operating system in an embodiment of the present invention. In this diagram, the left column shows an exemplary memory map for a first OS (400a). The middle column shows an exemplary memory map for a second OS (400b) which has a smaller memory footprint than the first OS. The right column shows the combined memory map (400c) depicting the overlapped memory. In one embodiment the first and larger OS may be the WINDOWS operating system and the second and smaller OS may be the ANROID operating system. All three memory maps (400a-400c) include memory locations allocated for firmware (such as UEFI firmware 402), hardware memory mapped I/O 404 and shadow memory 430. The first and larger OS memory map 400a also includes a large amount of volatile memory allocated to the first OS, its drivers and applications 406. In contrast, the memory map of the smaller second OS includes two smaller locations in volatile memory respectively allocated to the second OS, drivers and applications 408 and second OS data 409. As can be seen from the combined memory map 400c, when the enhanced dual OS behavior system utilizes both a larger and smaller OS, overlapped memory location one 410 and overlapped memory location two 420 will typically represent the smaller OS's memory usage (the Android OS in the above example), because of its typically smaller footprint in memory. However, in cases where the operating systems are two different instances of the same type of operating system, the overlap memory would be the intersection between the memory maps of the two operating systems. It is the contents of overlapped memory location one 410 and overlapped memory location two 420 that the embodiments of the present invention swap out to non-volatile storage when switching operating systems. In the instant example, the WINDOWS OS as the first OS would initially be loaded into memory. A subsequent switch to the ANDROID OS would save only the portion of the WINDOWS OS that was in overlapped memory location one 410 and overlapped memory location two 420 to non-volatile storage as the remainder of the first OS would remain in the volatile memory locations 406 not being used by the ANDROID OS and would be maintained during the switching process. As a result, when the WINDOWS OS is then subsequently re-activated, only the previously saved contents would need to be loaded rather than the whole OS thus speeding up the switching process. Although the above example has focused on the WINDOWS and ANDROID operating systems, it should be appreciated that the other operating systems may also be switched by embodiments of the present invention.

Figure 5:
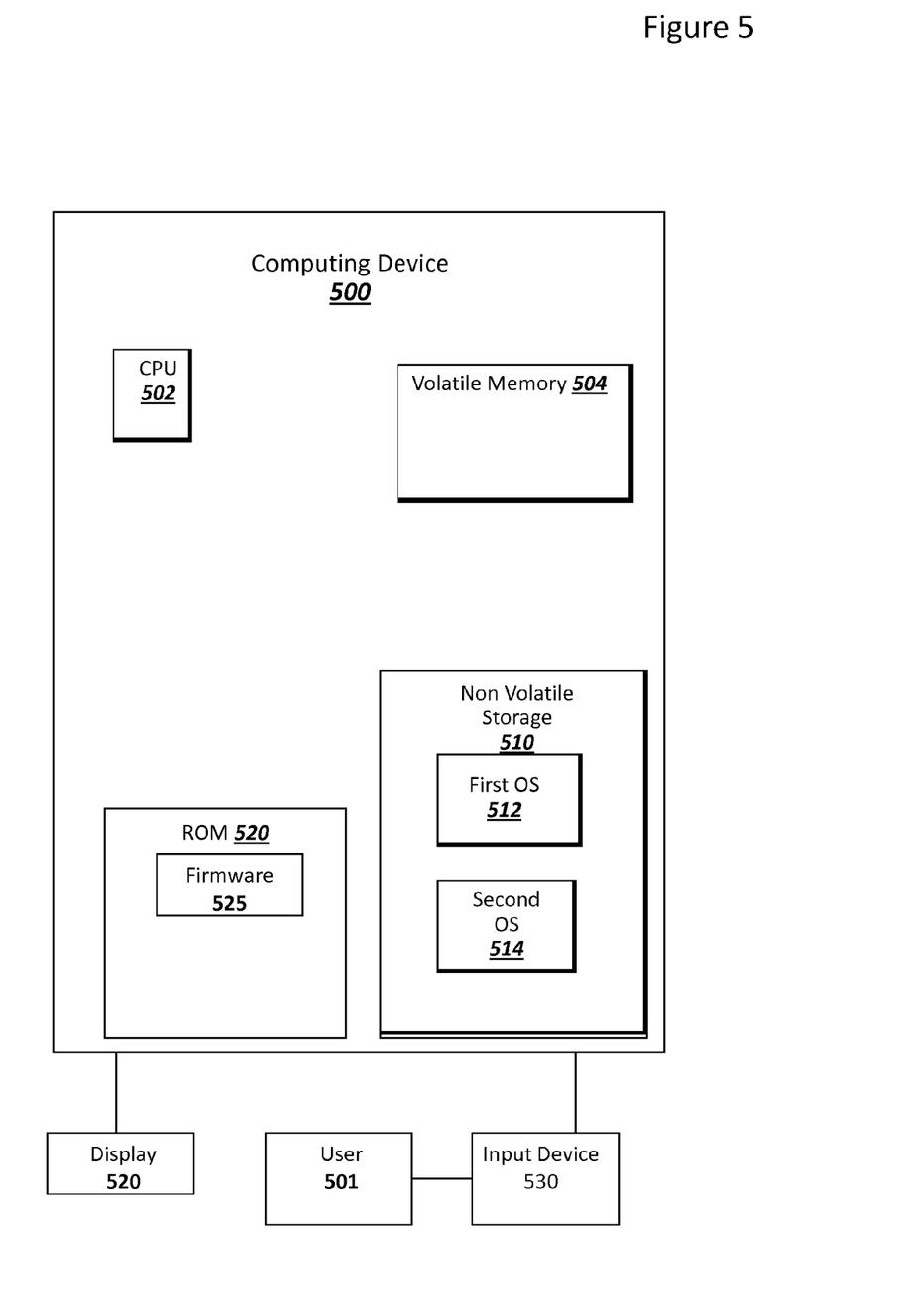
FIG. 5 depicts an exemplary environment suitable for practicing an embodiment of the present invention.

FIG. 5 depicts an exemplary environment suitable for practicing an embodiment of the present invention. A computing device 500 includes a CPU 502 used to process instructions. The computing device 500 may be a PC, laptop computer, tablet computing device, server, smartphone or some other type of computing device equipped with a processor and able to support the enhanced dual OS behavior described herein. CPU 502 may support SMM. However, it should be understood that references to SMM in the above description may also be replaced with other separate execution environments, such as TrustZone (TEE) in ARM processors, without departing from the scope of the present invention. The computing device may be accessed by user 501 using input device 530. A display 520 may be in communication with computing device 500 and viewable by user 501.

The computing device 500 may include volatile memory 504 such as Random Access Memory (RAM). A first OS 512 or second OS 514 that are stored on a hard drive 510 or other non-volatile storage that is in, or in a location in communication with, computing device 500 may be loaded into memory 504 as part of a boot process performed by the computing device and may be subsequently switched as described herein. The computing device 500 may also include flash or other ROM 520. In some cases the system design may incorporate multiple flash ROM devices. ROM 520 may include firmware 525 as described above that is operable at different points of the computing device's operation. Firmware 525 may be UEFI firmware. However, while the description herein describes implementations employing UEFI firmware, other firmware implementations that do not conform to the UEFI specification may be used without departing from the scope of the present invention. For example, CoreBoot™ or uBoot™ may be employed. Computing device 500 may support the enhanced dual OS behavior as described herein which allows the contents of overlapped memory locations in volatile memory 504 to be saved to non-volatile storage such as, but not limited to, hard drive 510 or ROM 520 when switching between first OS 512 and second OS 514.

It will be appreciated that other embodiments of the present invention in addition to those specifically described in reference to the figures may be implemented. Further other operating systems that support the necessary sleep state infrastructure to handle S3 sleep states may be utilized by embodiments of the present invention.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for switching operating systems in a computing device equipped with firmware and an enhanced dual operating system (OS) that includes a first OS and a second OS, the method comprising:
   determining with the firmware during a boot sequence for the computing device that the computing device supports an enhanced dual-OS behavior by verifying the availability of adequate non-volatile storage in which to save overlapped volatile memory location contents from the first OS and the second OS;
   enabling enhanced dual-OS behavior for the computing device with the firmware based on the determining of adequate non-volatile storage during the boot sequence;
   loading, with the firmware, the first OS into volatile memory for the computing device after the enabling;
   identifying a user-initiated switching event requesting a switch of operating systems that triggers a sleep state request of a first type for the computing device from the first OS;

detecting with the firmware that the enhanced dual-OS behavior has been enabled following the identifying of the user-initiated switching event;

altering, with the firmware, based on the detecting, the request for the sleep state of the first type to a sleep state of a different second type, or triggering, based on the identifying, a transition of the computing device to a different operating mode instead of the requested first type of sleep state;

saving with the firmware, in response to the user-initiated switching event, contents of overlapped memory locations that are used for the first OS in the volatile memory to non-volatile storage, the overlapped memory locations also used by the second OS;

loading, with the firmware, from non-volatile storage contents for a second OS to the overlapped memory locations in the volatile memory; and resuming operation of the computing device under control of the second OS.

2. The method of claim 1 further comprising;

identifying a second user-initiated switching event requesting a second switch of operating systems;

saving, with the firmware, in response to the second switching event, contents of the overlapped memory locations used by the second OS to non-volatile storage;

loading, with the firmware, from the non-volatile storage the previously saved contents from the overlapped memory locations used by the first OS to the overlapped memory locations in the volatile memory; and resuming operation of the computing device under control of the first OS.

3. The method of claim 1 further comprising:

setting a wake event with the firmware and causing a transition to the sleep state of the different second type with the device firmware in response to identifying the user-initiated switching event.

4. The method of claim 3 wherein the requested sleep state of the first type is an S4 hibernation sleep state and the firmware causes a transition to an S3 suspend sleep state instead of the requested S4 hibernation sleep state.

5. The method of claim 1 further comprising:

handling the sleep state request using the firmware, the firmware triggering a Central Processing Unit (CPU)-only reset instead of the requested sleep state.

6. The method of claim 1 wherein the user-initiated switching event is trapped by the firmware which causes the computing device to transition to System Management Mode (SMM).

7. The method of claim 1 wherein the first OS requires a smaller amount of memory in the volatile memory than the second OS.

8. The method of claim 1 wherein the first OS requires a larger amount of memory in the volatile memory than the second OS.

9. The method of claim 1 wherein the first OS and the second OS are a same type of OS.

10. A non-transitory medium holding computer-executable instructions for switching operating systems in a computing device equipped with firmware and an enhanced dual operating system (OS) that includes a first OS and a second OS, the instructions when executed causing the computing device to:

determine with the firmware during a boot sequence for the computing device that the computing device supports an enhanced dual-OS behavior by verifying the availability of adequate non-volatile storage in which to save overlapped volatile memory location contents from the first OS and the second OS;

enable enhanced dual-OS behavior for the computing device with the firmware based on the determining of adequate non-volatile storage during the boot sequence;

load, with the firmware, the first OS into volatile memory for the computing device after the enabling;

identify a user-initiated switching event requesting a switch of operating systems that triggers a sleep state request of a first type for the computing device from the first OS;

detect with the firmware that the enhanced dual-OS behavior has been enabled following the identifying of the user-initiated switching event;

alter, with the firmware, based on the detecting, the request for the sleep state of the first type to a sleep state of a different second type, or triggering, based on the identifying, a transition of the computing device to a different operating mode instead of the requested first type of sleep state;

saving with the firmware, in response to the user-initiated switching event, contents of overlapped memory locations that are used for the first OS in the volatile memory to non-volatile storage, the overlapped memory locations also used by the second OS;

load, with the firmware, from non-volatile storage contents for a second OS to the overlapped memory locations in the volatile memory; and resume operation of the computing device under control of the second OS.

11. The medium of claim 10 wherein the instructions when executed further cause the computing device to:

identify a second user-initiated switching event requesting a second switch of operating systems;

save with the firmware, in response to the second switching event, contents of the overlapped memory locations used by the second OS to non-volatile storage;

load, with the firmware, from the non-volatile storage, the previously saved contents from the overlapped memory locations used by the first OS to the overlapped memory locations in the volatile memory; and resume operation of the computing device under control of the first OS.

12. The medium of claim 10 wherein the instructions when executed further cause the computing device to:

set a wake event with the firmware and cause a transition to the sleep state of the different second type with the device firmware in response to identifying the user-initiated switching event.

13. The medium of claim 12 wherein the requested sleep state of the first type is an S4 hibernation sleep state and the firmware causes a transition to an S3 suspend sleep state instead of the requested S4 hibernation sleep state.

14. The medium of claim 10 wherein the instructions when executed further cause the computing device to:

handle the sleep state request using firmware, the firmware triggering a Central Processing Unit (CPU)-only reset instead of the requested sleep state.

15. The medium of claim 10 wherein the user-initiated switching event is trapped by the firmware which causes the computing device to transition to System Management Mode (SMM).

16. The medium of claim 10 wherein the first OS requires a smaller amount of memory in the volatile memory than the second OS.

17. The medium of claim 10 wherein the first OS requires a larger amount of memory in the volatile memory than the second OS.

18. The medium of claim 10 wherein the first OS and the second OS are a same type of OS.

19. A computing device equipped with firmware and an enhanced dual operating system (OS) that includes a first OS and a second OS, comprising:
   a central processing unit (CPU);
   a volatile memory;
   a non-volatile storage; and
   device firmware configured to:
      determine during a boot sequence for the computing device that the computing device supports an enhanced dual-OS behavior by verifying the availability of adequate non-volatile storage in which to save overlapped volatile memory location contents from the first OS and the second OS;
      enable enhanced dual-OS behavior for the computing device based on the determining of adequate non-volatile storage during the boot sequence;
      load the first OS into the volatile memory after the enabling;
      identify a user-initiated switching event requesting a switch of operating systems that triggers a sleep state request of a first type for the computing device from the first OS;
      detect that the enhanced dual-OS behavior has been enabled following the identifying of the user-initiated switching event;
      alter, based on the detecting, the request for the sleep state of the first type to a sleep state of a different second type, or triggering, based on the identifying, a transition of the computing device to a different operating mode instead of the requested first type of sleep state;
      save, in response to the user-initiated switching event, contents of overlapped memory locations that are used for the first OS in the volatile memory to non-volatile storage, the overlapped memory locations also used by the second OS; and
      load, from the non-volatile storage, contents for a second OS to the overlapped memory locations in the volatile memory,
   wherein operation of the computing device is resumed under control of the second OS.

20. The computing device of claim 19 wherein the firmware is configured to:
   set a wake event and causing a transition to the sleep state of the different second type in response to identifying the user-initiated switching event.

* * * * *